US007158135B2

(12) United States Patent
Santodomingo et al.

(10) Patent No.: US 7,158,135 B2
(45) Date of Patent: *Jan. 2, 2007

(54) EFFICIENT SCENERY OBJECT RENDERING

(75) Inventors: Victor Santodomingo, Redmond, WA (US); Jason L. Waskey, Seattle, WA (US); Jason M. Dent, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 134 days.

This patent is subject to a terminal disclaimer.

(21) Appl. No.: 11/079,154

(22) Filed: Mar. 8, 2005

(65) Prior Publication Data

US 2005/0156928 A1   Jul. 21, 2005

Related U.S. Application Data

(63) Continuation of application No. 10/096,217, filed on Mar. 11, 2002, now Pat. No. 6,952,207.

(51) Int. Cl.
*G06T 17/00* (2006.01)

(52) U.S. Cl. .................................................... 345/428

(58) Field of Classification Search ...................... None
See application file for complete search history.

(56) References Cited

U.S. PATENT DOCUMENTS

| 5,555,354 | A | 9/1996 | Strasnick et al. | 345/427 |
|---|---|---|---|---|
| 5,651,676 | A | 7/1997 | Artwick | 434/43 |
| 6,002,406 | A | 12/1999 | Zhao | 345/581 |
| 6,300,956 | B1 | 10/2001 | Apodaca et al. | 345/619 |
| 6,654,690 | B1 | 11/2003 | Rahmes et al. | 702/5 |
| 6,952,207 | B1 * | 10/2005 | Santodomingo et al. | 345/428 |
| 2001/0045956 | A1 | 11/2001 | Hurley et al. | 345/582 |
| 2002/0091005 | A1 | 7/2002 | Shoji et al. | 472/65 |
| 2003/0085896 | A1 | 5/2003 | Freeman | 345/428 |

FOREIGN PATENT DOCUMENTS

GB    2171579 A    8/1986

OTHER PUBLICATIONS

Dutton, Geoffrey. 1991. "Zenithial Orthotriangular Projection." In *Technical Papers 1991 ACSM-ASPRS Annual Convention*, 6 (Auto-Carto 10):77-95. Baltimore, MD.
Hammes, Johan. 2001. "Modeling of Ecosystems as a Data Source for Real-time Terrain Rendering." *Digital Earth Moving, 2001: First International Symposium*. 14pp. Available http://www.cimsi.cim.ch/dem2001/.

(Continued)

*Primary Examiner*—Mark Zimmerman
*Assistant Examiner*—Enrique L. Santiago
(74) *Attorney, Agent, or Firm*—Ronald M. Anderson

(57) ABSTRACT

The number of graphic objects in a visual tile rendered varies as a function of distance between the tile and a viewpoint in a simulation. Fewer objects are rendered when the tile is far from the viewpoint, and vise versa. A level of detail (LOD) value is pseudo-randomly selected and associated with each object, indicating the maximum distance at which the object will be visible. A current LOD value is determined for the tile. An object is rendered if its LOD value is equal or greater than the current LOD value of the tile. Objects are faded into and out of view by modulating an opacity value as the current LOD value changes. Texture values of an object are adjusted as a function of ambient and direct components of light on the object, to achieve lighting corresponding to time of day, current season, and/or region in the simulated world.

13 Claims, 10 Drawing Sheets

OTHER PUBLICATIONS

Nineteenseventyfive. "Natural World Terrain Manager." n.d., 7 pp. Available http://mzone.mweb.co.za/residents/jhammes/products.htm.

3D Nature, LLC. "What is Visual Nature Studio?" n.d., 10 pp. Available http://www.3dnature.com/vnsinfo.html.

Softlant Software and Allen Kriesman, Inc. 2000. "Terramodels for Fly II." 3 pp. Available http://avsim.com/terramodels/.

Microsoft Corporation; Developed by Zipper Interactive, Inc. 2000. Prior Art—Screen Print from Crimson Skies Game. 1 pg. Available http://www.microsoft.com/games/crimsonskies/.

Ubi Soft Entertainment; Developed by 1C:Maddox Games (of Russia). 2001. Prior Art—IL-2 Sturmovik Game. 1 pg. Available http://gamespot.com/gamespot/filters/products/screens/0,11105,354449167,00.html.

Eidos Interactive Ltd.; Developed by Innerloop Studies (*A Vision Park Company). 1997. Prior Art—Joint Strike Fighter Game. 1 pg. Available http://www.innerloop.no/projects/jsf/jsf_shote176.jpg.

Natural Graphics. "Natural Scent Designer 2.0." 1999. 2 pp. Available http://www.macaddict.com/issues/9910/rev.nsdesigner2.html.

Flight One Software, Inc. "FS Traffic—A Busy As It Gets." 2001. 2 pp. Available http://flight1.com/products.asp?product=JFL-FST-001.

TerraGear. Using VMap0 for FlightGear Scneery. n.d. 3 pp. Available http://www.terragear.org/docs/vmap0/.

"Levels of Detail (LOD) Engineering of VR Objects," Seo & Kang, Proceedings of the ACM symposium on Virtual Reality Software and technology, London, United Kingdom, pp. 104-110, Year of Publication: 1999, ISBN:1-58113-141-0.

\* cited by examiner

EFFICIENT SCENERY OBJECT RENDERING

RELATED APPLICATION

This application is a continuation of prior patent application Ser. No. 10/096,217, filed on Mar. 11, 2002 now U.S. Pat. No. 6,952,207, the benefit of the filing date of which is hereby claimed under 35 U.S.C. § 120.

FIELD OF THE INVENTION

The present invention generally relates to automatically rendering scenery objects in a computer environmental simulation, and more specifically, pertains to efficiently rendering a variety of graphical objects in a visually realistic manner over a perceptible region of the computer environmental simulation.

BACKGROUND OF THE INVENTION

Computer games and other applications that display a virtual environment often include background scenery to enhance the simulation of the environment. It is common to employ simple color patterns and/or other texture data to represent a terrain or other background surfaces in the environment. The background environment is often repetitively tiled using a relatively limited number of variations. Typically, these simple backgrounds are only two-dimensional (2D), and are not very realistic. However, 2D backgrounds can have much more complex and varied textures and may be designed to be computationally efficient in covering a large area in a simulated virtual environment.

To increase the realism of a simulation, three-dimensional (3D) scenery objects are sometimes used instead of, or in addition to, 2D backgrounds. For example, it is common to include 3D buildings, walls, vegetation, and other scenery objects in computer games. To provide even more realism, a well-known or easily recognized scenery object, such as a landmark or building, may be mapped to a specific location within the simulated environment corresponding to the location of the real object in the environment. Some simulations are thus able to provide very detailed scenery objects in a limited region of the simulated environment, but because of the labor involved, the detail is confined to a relatively small area. For instance, some automobile racing games include very detailed scenery objects that correspond to real buildings, traffic signs, trees, and other objects along some selected streets of cities in which auto races are held, but the remainder of the simulated streets of the cities lack detail and variety.

However, even with foreseeable increases in processor speeds and storage sizes, it is impractical to define, store, and render a scenery object corresponding to each real object over an extended area, such as an entire metropolitan area. The problem becomes even more significant when the simulated environment includes the entire surface of the Earth. Consequently, in prior art simulated virtual environments, 3D scenery objects are often used to simulate specific landmarks in only a few limited areas, while 2D terrain background is typically used in the remaining larger areas of the simulation. For example, as indicated above, it is common to provide 3D simulations of specific landmark buildings in the central portions of a metropolitan area, while using 2D terrain backgrounds in the outskirts.

Clearly, it would generally be desirable to provide more realistic 3D scenery throughout a simulated environment. One method to achieve this result is to pseudo-randomly populate 2D terrain backgrounds with 3D scenery objects that appear realistic, but do not necessarily replicate real objects in the environment. A method to pseudo-randomly generate data for such 3D scenery objects is described in a commonly assigned patent application entitled, "Automatic Scenery Object Generation," which is filed concurrently. Rendering such automatically generated 3D scenery objects in real time requires a more efficient processing technique than is currently employed for rendering only a relatively few landmarks in limited areas. Landmark objects, or other fixed 3D scenery objects, can be preprocessed for efficient rendering, because their location, size, and other characteristics are known well before rendering is needed.

Similarly, some prior systems utilize a library of fixed 3D scenery objects to randomly populate a scene. Although the location of the objects may be randomly determined, the size, shape, texture, and other characteristics are predetermined. Thus, these library objects can be preprocessed for rendering in a manner similar to that used for landmarks or other fixed objects that are manually created and inserted into a simulated environment.

In contrast, the characteristics of automatically generated scenery objects may not be known unless and until it is determined that the scenery objects should be generated. For example, it is desirable to condition object rendering on whether the object is "within view," or whether the object will be within view shortly, or whether the object is not viewable due to darkness, or upon other criteria that must be satisfied during execution of the simulation. Further, it would be more efficient and more realistic to only render objects that are within view, and to gradually fade in more objects as they become closer to a user's viewpoint. It would be desirable to have predefined object data, but only render those objects that satisfy criteria appropriate for the current circumstances of the simulation during execution. Similarly, it would be desirable to render objects with realistic lighting depending on current conditions in the simulated environment, including for example, the time of day, season of the year, and regional location of the objects in the simulated environment. To provide scenic variety with automatically generated realistic objects, it will be preferable to pseudo-randomly generate and render 3D scenery objects during execution of a simulation in an efficient manner that does not rely on significant preprocessing.

An important application for such efficient rendering of a simulated environment arises when providing a realistic terrain over which aircraft fly in a flight simulator program. A solution to the problems described above was developed for use in Microsoft Corporation's FLIGHT SIMULATOR 2002™ product, which was released for sale in 2001. Subsequently, others appear to have recognized the value of automatically generating a variety of scenery objects that are related to the underlying 2D terrain texture in a simulated environment and have released similar products. However, these other products do not appear to render scenery objects in a manner that obtains the desired efficiencies described above. For example, a freeware product called TERRAMODELS™, produced by Softlang Software and Allen Kriesman, Inc., reportedly generates scenery objects to populate the background landscape in a flight simulator program called FLY II™, which is sold by Terminal Reality, Inc. However, FLY II™ does not appear to vary the number of objects rendered at various distances from a viewpoint of the user, and does not appear to provide other rendering efficiencies discussed above.

SUMMARY OF THE INVENTION

The present invention is directed to a method and system for determining when to render a particular graphic object within one of a plurality of visual tiles in an electronic simulation, so that the rendering is efficient and more realistically portrays what an observer would expect to see as the distance decreases between the graphic objects and an observer's viewpoint. The determination is made as a function of a distance between the visual tile and the viewpoint in the electronic simulation. Graphic objects associated with the visual tile are pseudo-randomly associated with a plurality of different distance ranges such that fewer of the graphic objects are rendered when the visual tile is far from the viewpoint, and more of the graphic objects are rendered when the visual tile is closer to the viewpoint. Rendering of the graphic objects is initially triggered when the visual tile comes within a predetermined distance of the viewpoint. Additional graphic objects are then rendered as the distance decreases between the visual tile and the viewpoint. Conversely, some of the graphic objects are removed from the rendered view as the distance increases between the visual tile and the viewpoint.

Preferably, when a visual tile falls within a predefined maximum range from the viewpoint, a level of detail (LOD) value is pseudo-randomly selected for each graphic object in the visual tile and included in data defining the graphic object, which are associated with the visual tile. The LOD value indicates a maximum radial distance between the viewpoint and the visual tile at which the graphic object will be visible in the electronic simulation, i.e., a radial range of rings centered about the viewpoint within which the graphic object will be visible. Preferably, the LOD value is pseudo-randomly selected based on a seed value that is a function of the location of the visual tile in the simulation. During each frame, a current LOD value is determined for the visual tile and compared with the LOD values that were pseudo-randomly selected for each of the graphic objects in the visual tile. Graphic objects associated with the tile are rendered if they have the same LOD value as the current LOD value determined for the tile. Preferably, the graphic objects are faded into view and out of view by modulating an opacity value as the current LOD value is changing. When the current LOD value changes, the number of graphic objects that are rendered also changes, but by fading in or fading out the graphic objects over time, an abrupt change in the number of graphic objects that are rendered is avoided.

Each graphic object is preferably rendered as either a solid object with multiple adjacent surfaces (e.g., buildings) or as an orthogonal-planar object (e.g., trees or other vegetation). Textures are applied to the adjacent surfaces or orthogonal planes of these different types of objects. However, to prevent undesirable splits in the textures where surfaces adjoin, such as at a window or doorway, the textures are mapped to the size of a graphic object in increments of an integral cell size of the texture.

Another aspect of the invention is directed to efficiently rendering a graphic object based on conditions in the simulated environment. For example, the location of a light source, such as the sun, and an intensity of light incident on the graphic object are determined as a function of the time of day, the current season of the year, and/or the location of the graphic object in the simulated world. Similarly, the texture applied to the graphic object is selected as a function of the conditions in the simulated environment. The texture values at each point on the graphic object are further adjusted as a function of the light source direction and the intensity of the light incident on the graphic object. To make such adjustments, a normal is calculated for each surface of the graphic object, so that an ambient component and a direct light component can be determined relative to each normal. These light components are used to adjust the colors of the texture at each point. Each point (display pixel) on a surface of the graphic object is also adjusted by modulating the opacity value to cause the graphic object to fade into and out of view as noted above, or as the environment changes between day and night lighting conditions.

Another aspect of the invention is directed to a machine readable medium storing machine instructions for causing a processor to perform the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
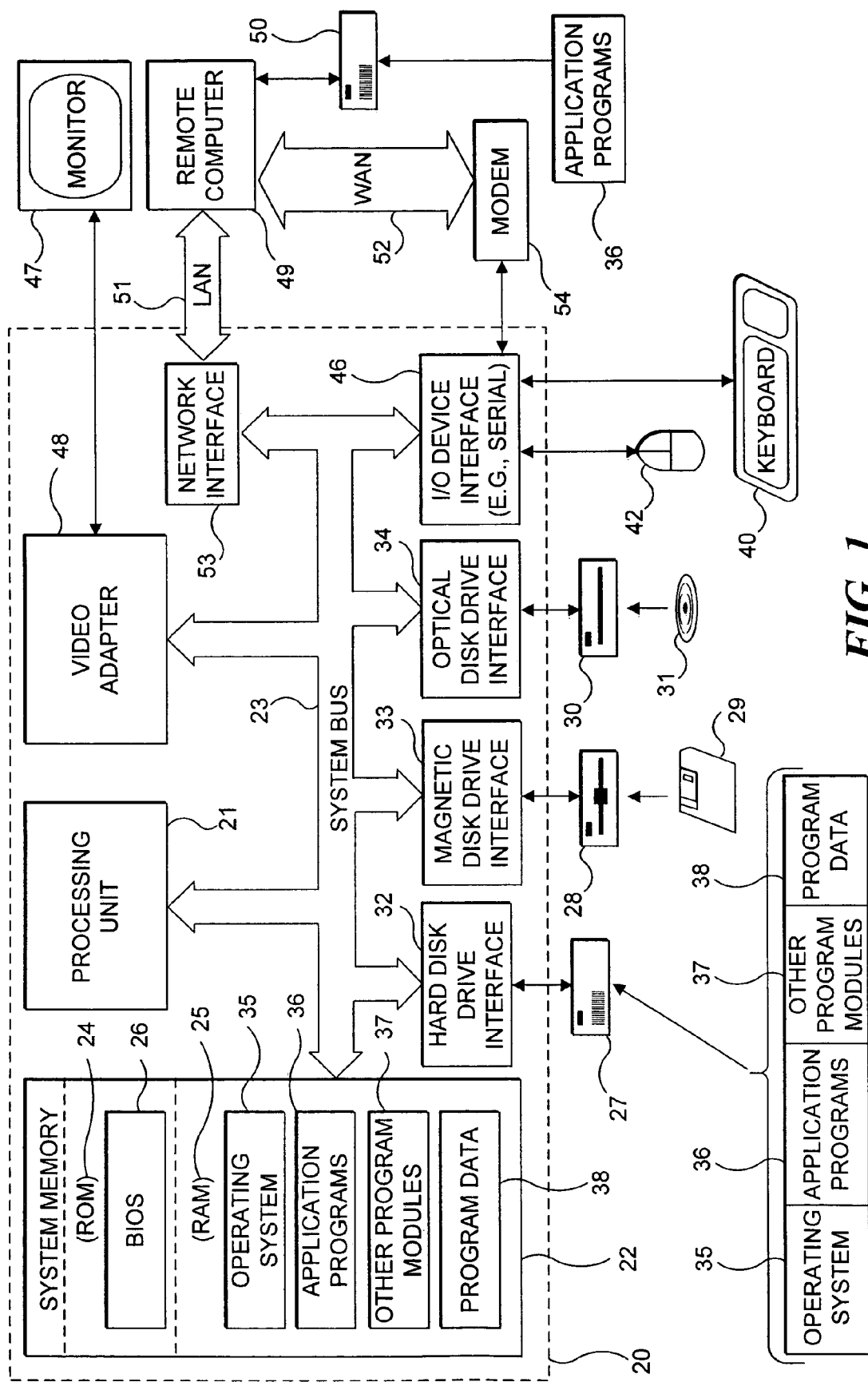
FIG. 1 is a block diagram of an exemplary system for implementing the present invention, using a general purpose computing device in the form of a conventional personal computer (PC)

FIG. 1 and the following discussion are intended to provide a brief, general description of a suitable computing environment in which the present invention may be implemented. The invention may be practiced on a single computing device, but can also be practiced on a client computing device coupled in communication with a server and/or one or more other remote computing devices over a communication network. Both the client computing device and the server will typically each include the functional components shown in FIG. 1. Although not required, the present invention will be described in the general context of computer executable instructions, such as program modules that are executed by a PC. Generally, program modules include application programs, such as computer simulations, routines, objects, components, functions, data structures, etc. that perform particular tasks or implement particular abstract data types. Also, those skilled in the art will appreciate that this invention may be practiced with other computer system configurations, particularly in regard to a client device for executing computer simulations, including game consoles, hand-held devices, pocket personal computing devices, digital cell phones adapted to execute simulations and to wirelessly connect to a network, other microprocessor-based or programmable consumer electronic devices, multiprocessor systems, network PCs, minicomputers, mainframe computers, and the like. The present invention may also be practiced in distributed computing environments, where tasks are performed by remote processing devices that are linked through a communications network. In a distributed computing environment, program modules may be located in either or both local and remote memory storage devices.

With reference to FIG. 1, an exemplary system for implementing the present invention includes a general purpose computing device in the form of a conventional PC 20, which is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disk 29, and removable optical disk 31, it will be appreciated by those skilled in the art that other types of computer readable media, which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, the simulated environment provided-by the present invention, and/or other information. In addition to the monitor, PCs are often coupled to other peripheral output devices (not shown), such as speakers (through a sound card or other audio interface—not shown) and printers.

As indicated above, the invention may be practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Embodiment

As noted above, a preferred embodiment of the present invention was initially developed as an automatic scenery generator to produce landscape as a background for aircraft flying in Microsoft Corporation's FLIGHT SIMULATOR 2002™ flight simulator program. In this exemplary embodiment, the invention makes use of underlying terrain data and automatically generated scenery object data in rendering scenery objects that overlay the terrain data. Information regarding the underlying terrain data and automatically generated scenery object data is described in applicants' concurrently filed patent application entitled, "Automatic Scenery Object Generation," the drawings and specification of which are hereby specifically incorporated herein by reference.

Figure 2A:
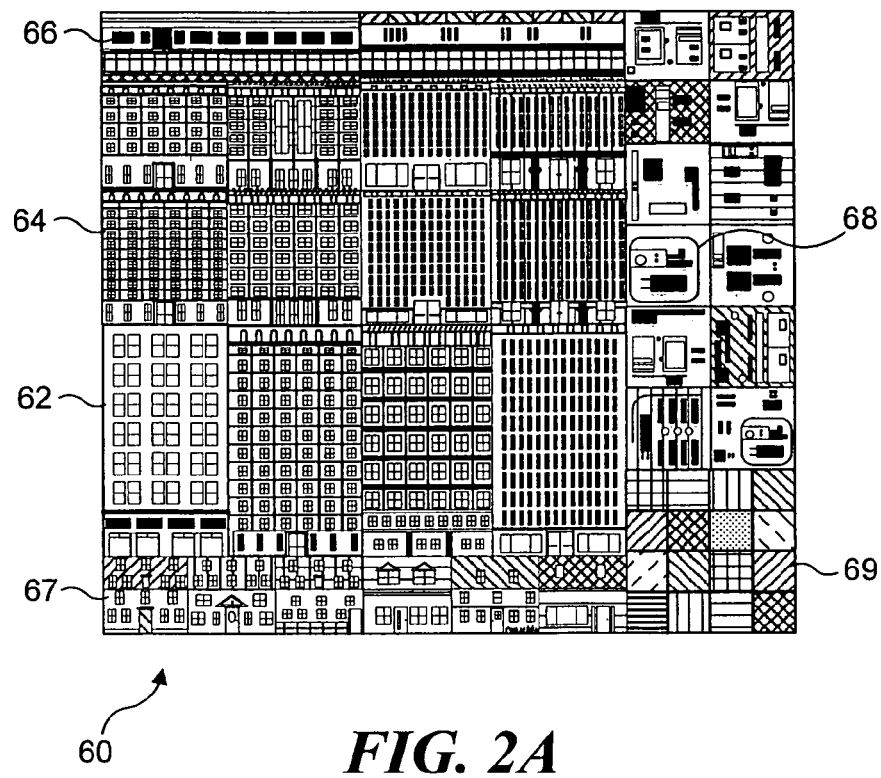
FIG. 2A is a schematic diagram illustrating a texture that includes a variety of wall and roof textures used for buildings.

FIG. 2A illustrates a texture 60 with a variety of wall textures and roof textures. Preferably, texture 60 is stored as a bitmap image file and includes the textures for walls and roofs of a related architectural style. For example, a wall texture 62 represents a large urban building commonly found in North America. Similarly, a wall texture 64 represents a small or medium size office building commonly found in North America. A wall texture 66 represents a typical industrial warehouse. For smaller residential buildings, a variety of North American house textures, such as a house texture 67, are also provided. Correspondingly, a related variety of roof textures are provided that can be matched with the various wall textures. For example, a roof texture 68 may be selected from the various roof textures for office buildings and used with a selected office building wall texture. Similarly, a residential roof texture, such as a roof texture 69, can be associated with a selected house wall texture.

Other architectural styles are provided in different texture files. Also, a separate texture file corresponds to a night-time version of texture 60. Other versions of a texture file may be included for winter conditions, e.g., when snow is partially covering the roof textures. Alternatively, different versions of the same wall and roof textures may be provided in a single texture file. In general, a number of wall and roof textures are preferably included in a single texture file to provide visual variety for the graphic objects. Further, utilizing a single texture file enables pipelining of the data in the texture file on a video card and minimizes loading different data for different texture files, thereby reducing memory access requirements and improving rendering speed.

Figure 2B:
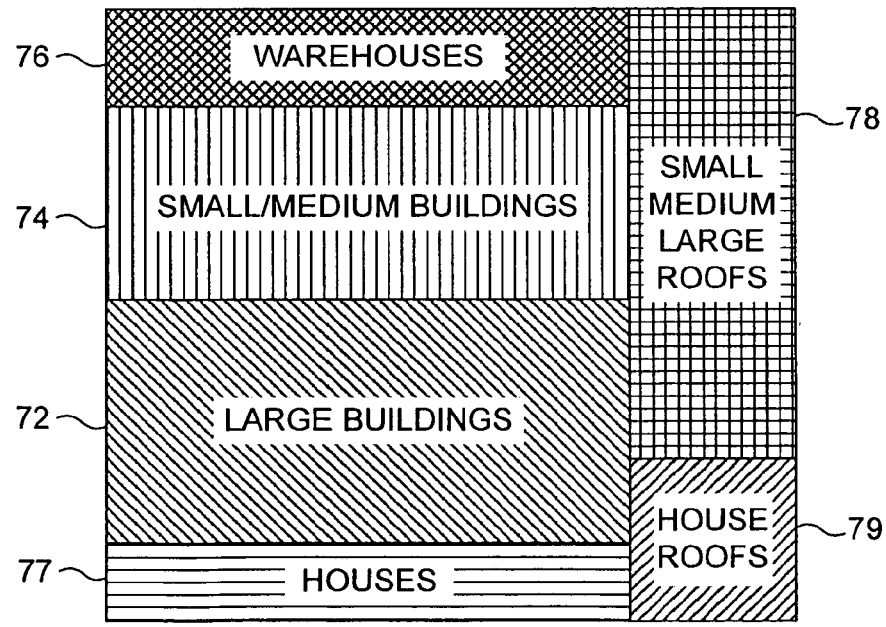
FIG. 2B is a schematic diagram illustrating a logical texture map of the various wall and roof textures provided in the texture.

FIG. 2B illustrates a logical texture map 70 of the various wall and roof textures provided in texture 60. Texture map 70 enables use of a consistent logical processes to access various texture files that contain different architectural styles, or other characteristics. Texture map 70 is generally divided into a set of wall textures at the left and a set of roof textures at the right. As suggested above, building wall textures are divided into groups according to building size. For example, a group 72 comprises wall textures for large urban buildings. A group 74 includes wall textures for small and medium-sized office and apartment buildings. A group 76 comprises wall textures for industrial warehouses. A group 77 provides wall textures for residential houses or other small buildings. Analogously, a group 78 comprises a variety of flat roof textures for large urban buildings, small and medium-sized office and apartment buildings, and warehouses. Finally, texture map 70 includes a group 79 of roof textures that are appropriate for flat and pitched roof houses and other small buildings. Those skilled in the art will recognize that texture map 70 may be arranged based upon many other groupings of textures.

Figure 3:
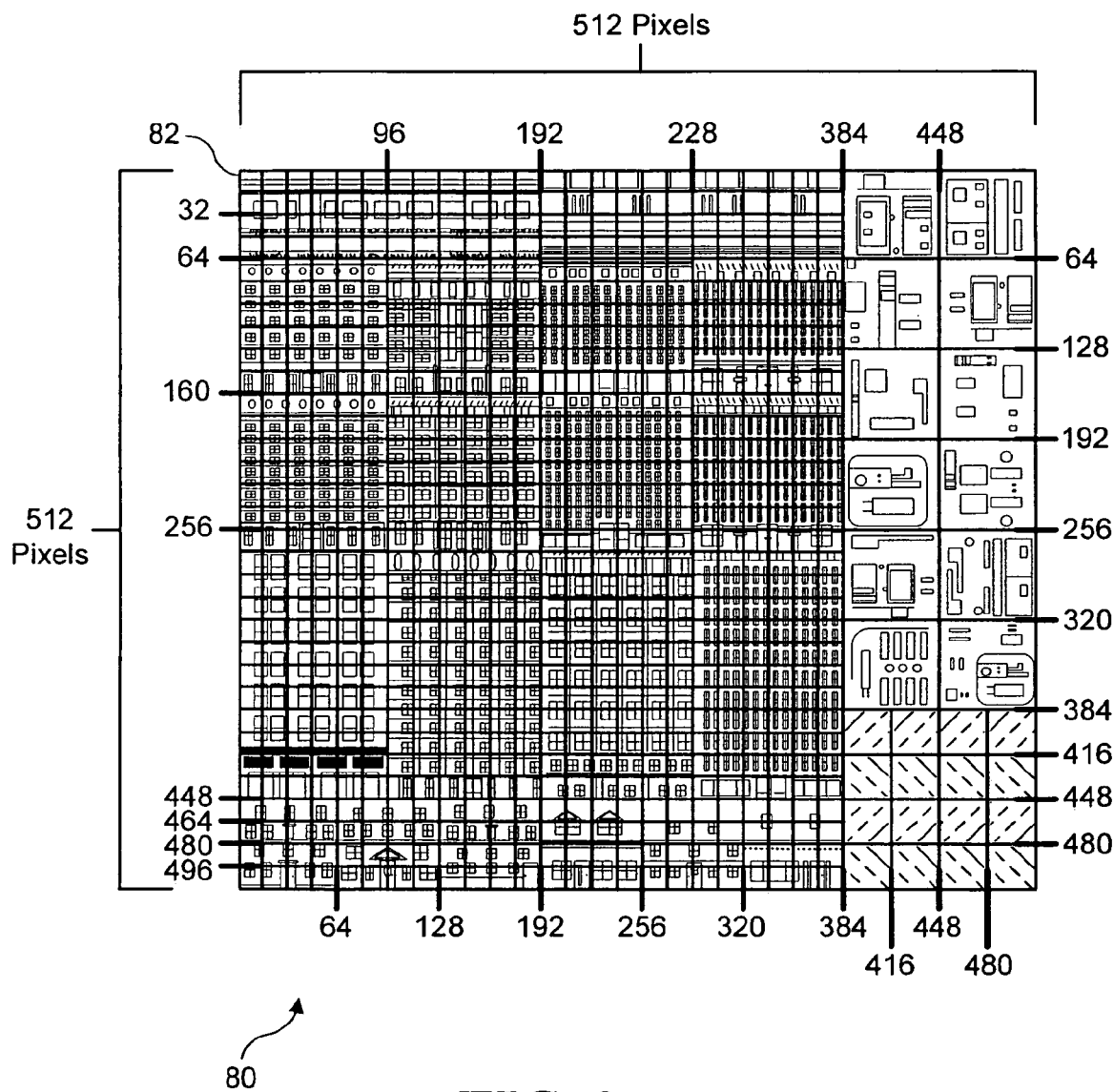
FIG. 3 is a schematic diagram illustrating a grid system for accessing the wall and roof textures.

FIG. 3 illustrates a grid system 80 for accessing the wall and roof textures. Grid system 80 includes cells, such as a cell 82, that enable buildings to be rendered as any number of integral increments of cells. For example, a building that is taller than any of the wall textures may be rendered by adding additional integral cell increments of the same wall texture until the desired height is achieved. Similarly, multiple cells of a roof texture may be applied to cover the desired roof area of a building in relation to a footprint area of the building. Those skilled in the art will recognize that the textures may alternatively be expanded or contracted to map into the size of a graphic object.

Figure 4:
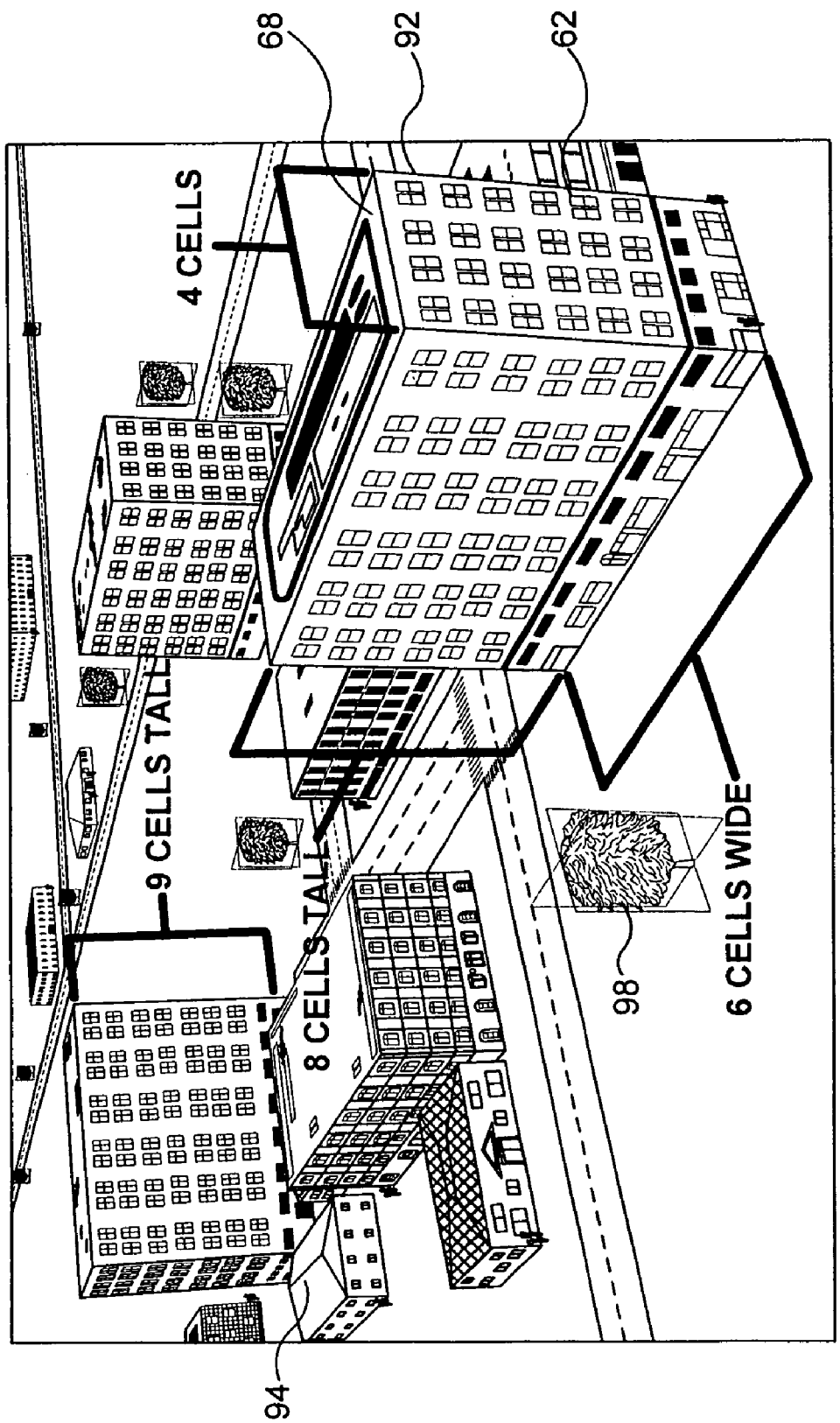
FIG. 4 illustrates a scene comprising a number of buildings and vegetation objects that are rendered with a pseudo-randomly determined variety of wall and roof textures.

FIG. 4 illustrates a scene 90 comprising a number of buildings and vegetation objects that are rendered with a pseudo-randomly determined variety of wall and roof textures. For example, a building 92 is rendered with wall texture 62 and roof texture 68. An appropriate number of cells of wall texture 62 are mapped to each face of building 92, according to the width and height of each face. Cell sizes may be determined from a texture file header, or may remain a predetermined size for all texture files to reduce computing complexity. Note that the rendered texture may have a slightly different width, height, and depth than originally defined in the texture file. Such differences result from mapping the texture to the dimensions of the graphic object so that the nearest integral cell size is applied. This mapping achieves a uniform appearance on each face and prevents cell splitting at corners, which may produce undesirable results, such as split (partial) windows and doors.

Correspondingly, roof texture cells may need adjusting during rendering to fit the building width and depth. For example, roof texture 68 is adjusted to fit the building footprint. For sufficiently large building footprints, such as for industrial warehouses, multiple cells of a roof texture may be applied to cover the roof area rather than adjusting a single cell of the selected roof texture. Note, however, that it is preferable to avoid applying multiple cells of a pitched roof texture over a large area. Preferably, a pitched roof is applied only to buildings with a small footprint area, such as a house 94. Multiple cells of a pitched roof texture may be applied along a long thin building such that the crest of the roof parallels the long dimension of the building. However, to reduce computing complexity and maintain realism, it is preferable to avoid multiple crests over a large building and to avoid blending pitched roofs with intersecting crests.

Figure 5:
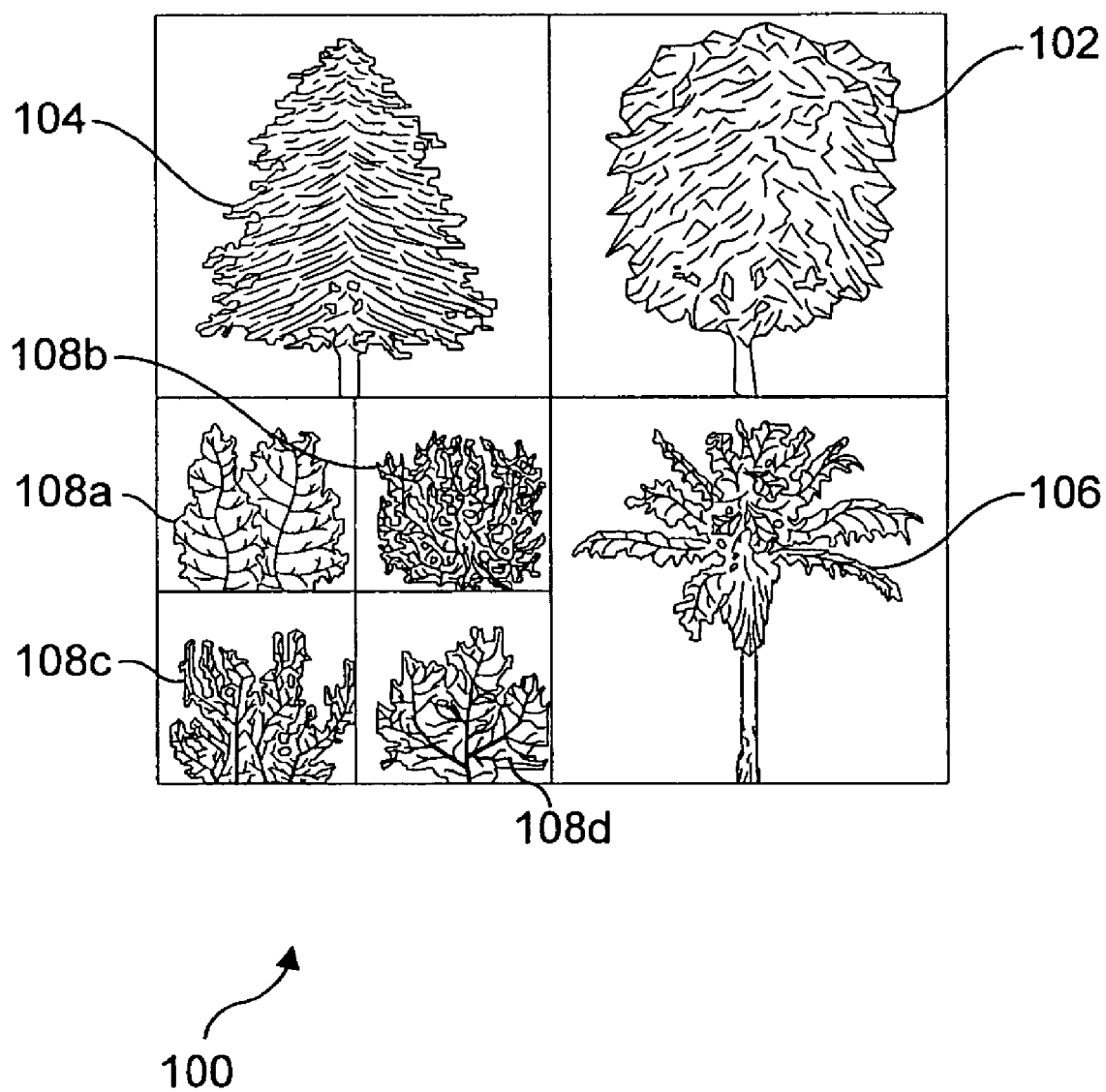
FIG. 5 illustrates a vegetation texture that can be used to render vegetation objects on orthogonal planes.

Other scenery objects, such as vegetation, are preferably rendered as a simpler type of object. For example, a tree 96 is rendered as a pair of intersecting orthogonal planes. The tree texture is rendered on each of the orthogonal planes, providing a 3D appearance from most viewing angles. FIG. 5 illustrates a vegetation texture 100 that can be used to render vegetation objects on orthogonal planes. Vegetation texture 100 comprises a variety of tree and shrub textures. For example, a deciduous tree texture 102 may be used to render leafy trees. A coniferous tree texture 104 may be used to render evergreen trees. Similarly, a palm tree texture 106 may be used to render tropical trees. In addition, a variety of shrub textures 108*a*–108*d* may be used to render shrubbery. Different vegetation textures are preferably used in the simulated environment at different seasons of the year. A corresponding alpha mask (not shown) is also preferably used in conjunction with the vegetation texture to cause the area beyond the outline of the vegetation object on each plane to be transparent when the orthogonal planes are rendered in the simulation. This 1-bit alpha channel mask eliminates from view the outline of each rectangular plane, making the vegetation objects appear more realistically three dimensional.

Figure 6:
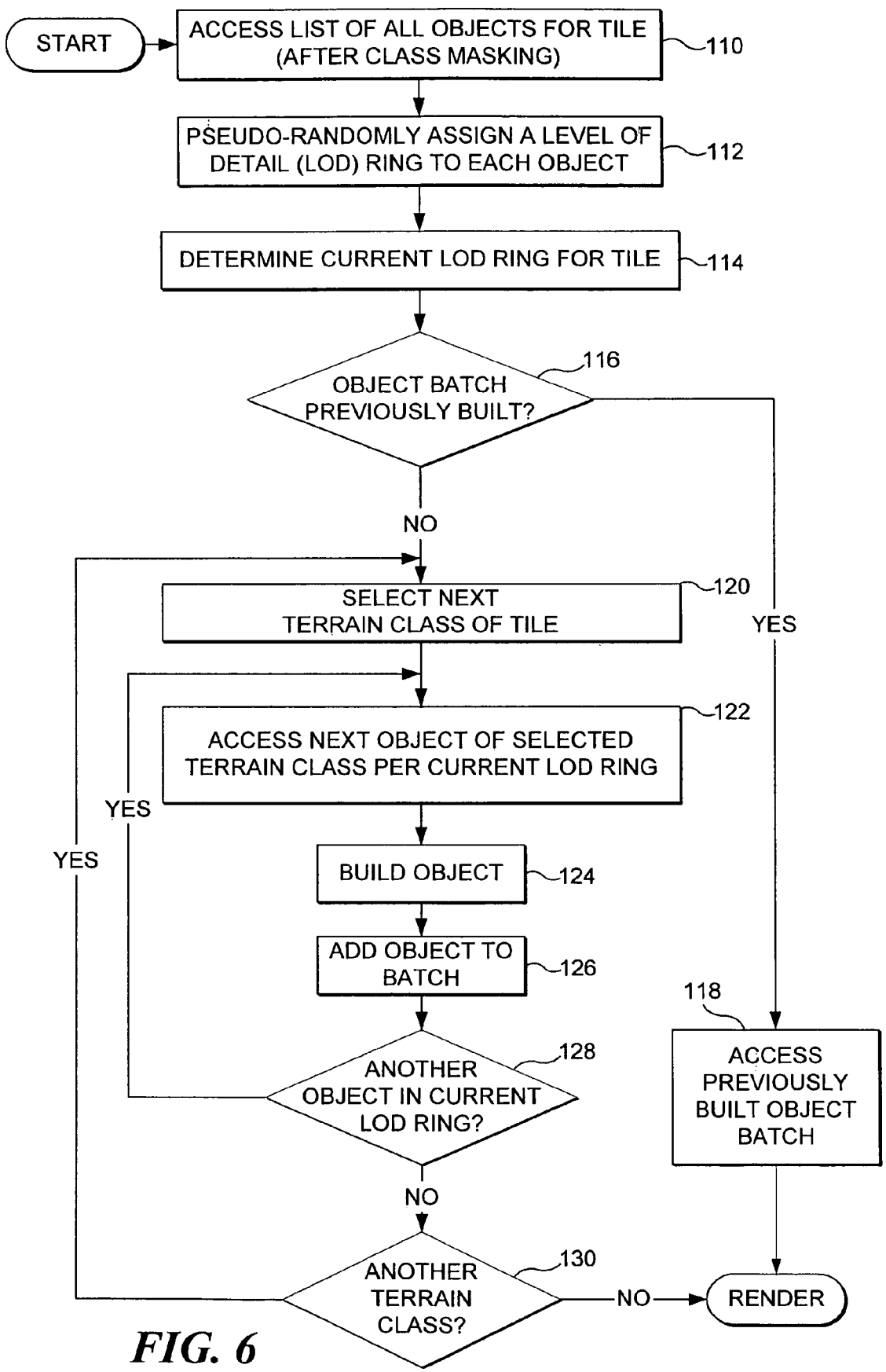
FIG. 6 is a flow diagram illustrating overall logic for building a batch of scenery objects to be rendered in a tile.

FIG. 6 is a flow diagram illustrating overall logic for building a batch of scenery objects to be rendered in a tile. At a step 110, an Autogen module accesses a list of objects to be rendered in a tile. The list of objects and data defining the objects are preferably pseudo-randomly generated and screened with a masking process that associates the objects with various types of terrain classes that underlie the 3D scenery objects. At a step 112, the Autogen module pseudo-randomly assigns a level of detail (LOD) value or ring to each object. An LOD ring represents a distance or range of distances corresponding to the outer and inner radii of the annular ring relative to a central viewpoint. In the flight simulator example, an LOD ring represents a ring representing an inner and outer radial distance from a simulated aircraft being flown by a user. When a tile is sufficiently close to the simulated aircraft, all of the scenery objects in the tile will be rendered. However, as the distance between the simulated aircraft and a tile increases, fewer scenery objects are rendered, because less detail is needed (i.e., visible) at the greater distance. Thus, the Autogen module pseudo-randomly assigns an LOD ring to each scenery object to indicate the objects in the tile that will be rendered at different radial distances between the aircraft and the tile. These radial distances correspond to the LOD rings around the aircraft. As the aircraft flies relative to a tile, the LOD ring in which the tile is disposed changes, causing the objects that are rendered and visible to change, based upon the LOD ring associated with each object.

Assignment of an LOD ring to an object is preferably made as a function of a seed value that is based on the location of the tile in relation to other tiles in the simulated environment. The seed value is used to initiate random assignment of an LOD ring for each object in the tile in a daisy chain fashion. In practice, the seed value is used by a random number function to generate a number that will fall in the range of an LOD ring. The generated number is then used as a seed value for randomly selecting another LOD ring for the next object in the tile. Thus, the LOD ring for each object in the tile is randomly determined, but each object in the tile will always be assigned its same LOD ring. Since the randomization process is initiated with a consistent seed value based on the tile location, the objects will be consistently rendered (or removed) in the same order. Additional scenery objects are rendered in the tile as the aircraft flies closer to the tile, and fewer are rendered in the tile as the aircraft flies away from the tile. LOD rings can be set at any increment of distance from the viewpoint. Each LOD ring preferably corresponds to a different increment or percentage of objects in the tile that will be rendered and visible.

After assigning an LOD ring to each scenery object of the tile, the Autogen module determines, at a step 114, what the current LOD ring is for the tile. The current LOD ring is the LOD ring in which the tile is disposed. In other words, a tile is in a specific LOD ring if the radial distance between the tile and the viewpoint (typically the aircraft) is between the inner and outer radial distances of the LOD ring, relative to the viewpoint. Based on the current LOD ring, the Autogen module determines, at a decision step 116, whether a batch of scenery objects were previously built for the tile at the current LOD ring. A batch of scenery objects for a tile may have been previously built when the simulated aircraft flew close enough to the tile to cause that batch of scenery objects to be built. However, the aircraft may have later flown far enough away from the tile such that the objects in the tile would no longer be visible. If a batch of scenery objects were previously built and still remain in memory, the Autogen module accesses that previously built batch of objects, at a step 118. It is contemplated that previously built objects may be retained or cached in memory until some predetermined period of time lapses, until memory capacity is required for more recently built objects, until the distance from the viewing point exceeds some predetermined value, or until some other criteria are met.

If a batch of scenery objects was not previously built for the tile at the current LOD ring, the Autogen module selects the lowest-priority terrain class associated with the tile that has scenery objects associated with that terrain class. Multiple terrain classes may be associated with the tile in a prioritized order. For example, a suburban terrain class may be at a lower priority than an urban terrain class. Different types and sizes of scenery objects may be associated with each terrain class and masked or otherwise blended into the tile. For ease of processing, the scenery objects of each terrain class are processed together. Thus, at a step 120, the Autogen module selects the next lowest-priority terrain class to be processed. At a step 122, the Autogen module accesses data associated with an object of the selected terrain class and associated with an LOD ring corresponding to or radially outside the current LOD ring. With the object data, the Autogen module generates additional rendering data at a step 124, as necessary to build the object. Additional detail regarding step 124 is described below with regard to FIGS. 7–9. At a step 126, the Autogen module adds the built object to the batch associated with an LOD ring that corresponds to, or is radially outside, the current LOD ring.

At a decision step 128, the Autogen module then determines whether another object in the selected terrain class is associated with an LOD ring equal to, or radially outside, the current LOD ring. If another object is to be built, control returns to step 122. Once all of the objects have been built that are associated with an LOD ring that is equal to, or radially outside, the current LOD ring, for the selected terrain class, the Autogen module determines, at a decision step 130, whether another terrain class is associated with the tile to be rendered. If more objects must be built for another terrain class associated with the tile, control returns to step 120. When all of the scenery objects associated with an LOD ring that is equal to, or radially outside, the current LOD ring, have been built or accessed from a previously built batch of objects, the objects associated with an LOD ring that is equal to, or outside, the current LOD ring are rendered as described in further detail below.

Figure 7:
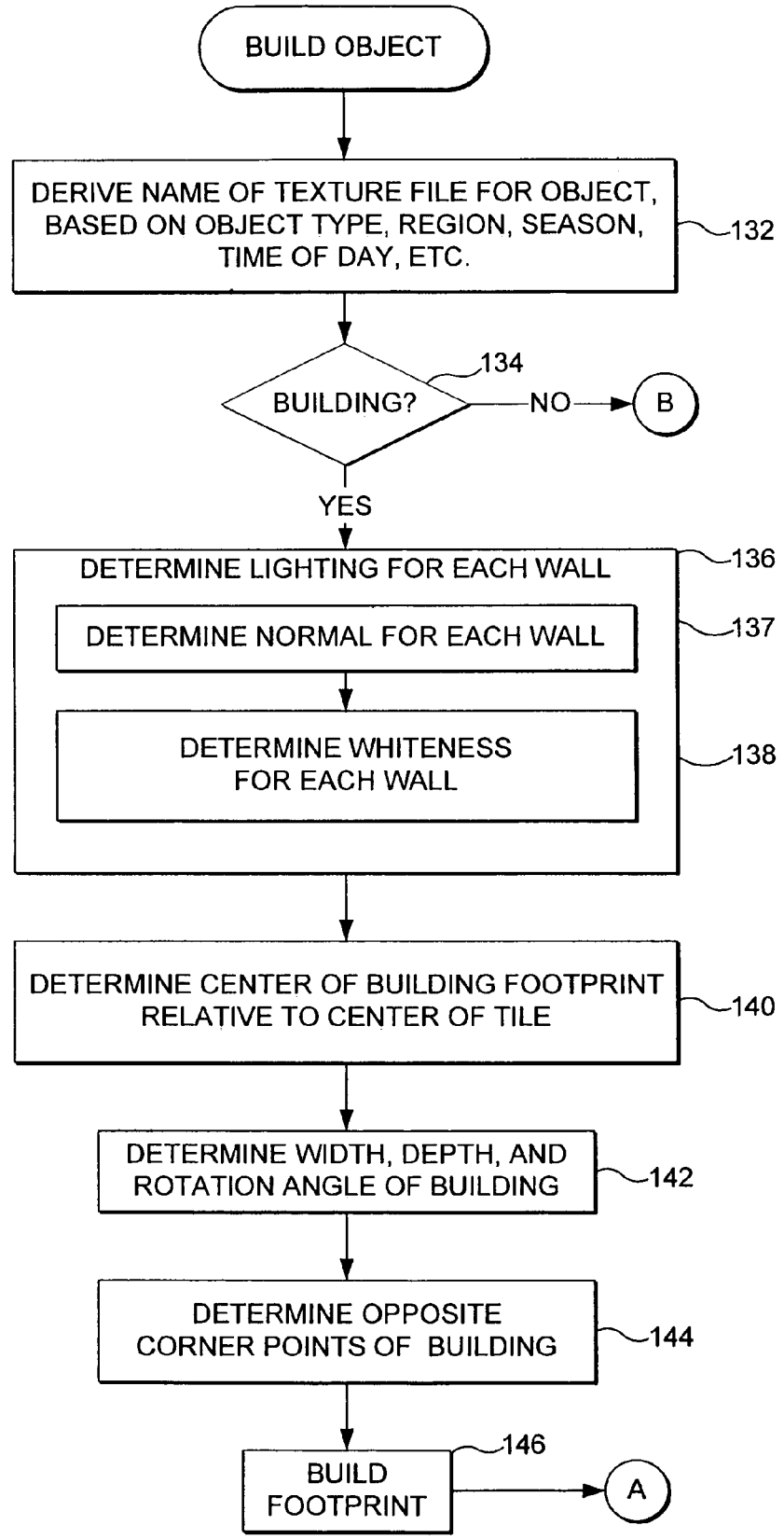
FIG. 7 is a flow diagram illustrating logic for generating graphics data used to display a 3D building.
Figure 8:
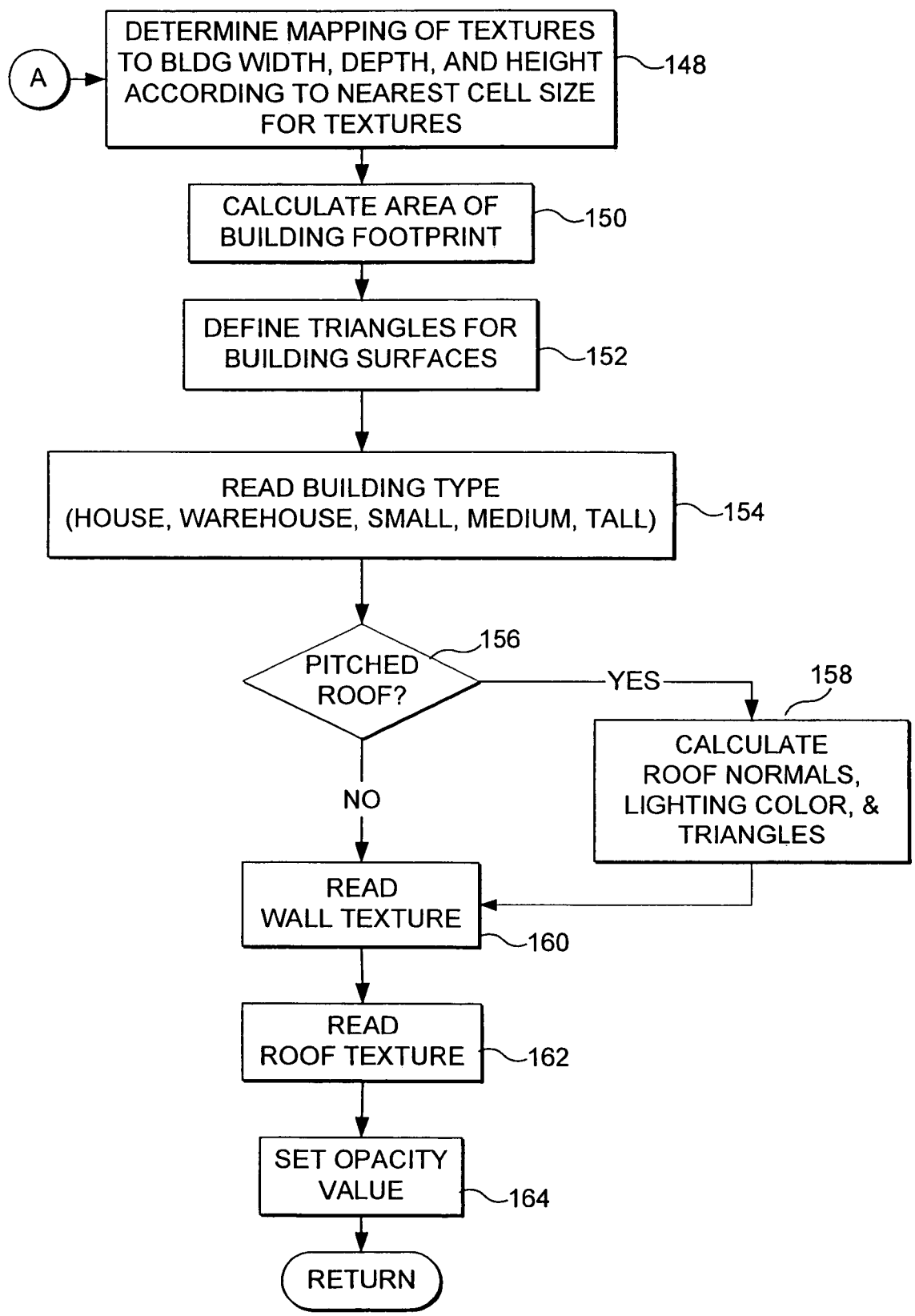
FIG. 8 is a flow diagram illustrating continued logic for generating graphics data to render a 3D building.
Figure 9:
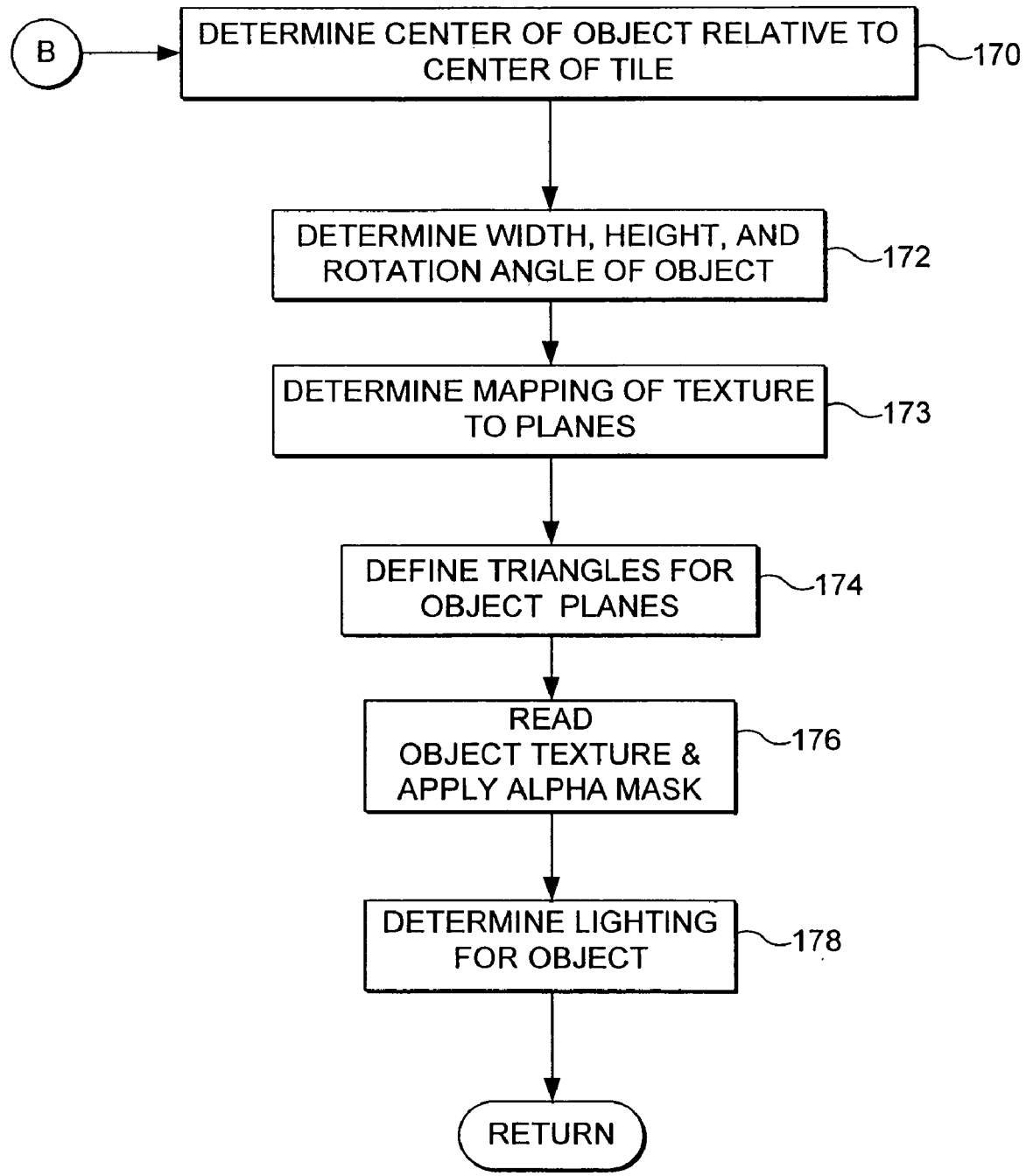
FIG. 9 is a flow diagram illustrating logic for generating graphics data to display an alternate type of 3D object, such as a vegetation object.

As indicated above, FIGS. 7, 8, and 9 provide further detail regarding step 124 of FIG. 6. FIG. 7 is a flow diagram illustrating logic for generating graphics data used to display a 3D building. At a step 132, the Autogen module derives a name of a texture file to be used in rendering the object. The file name is derived from the type of object, the architectural style for the region of the world in which the simulated aircraft is flying, the season of the year, the time of day, and/or other characteristics of the simulated environment. At a decision step 134, the Autogen module determines whether the current object type is that of a 3D building. If the object type is not that of a 3D building, control passes through a connector B to a process for other types of scenery objects, such as vegetation objects. If, however, a 3D building is to be rendered, the Autogen module determines lighting for each wall of the building, at a step 136. This step includes a number of substeps, such as determining a normal for each wall of the building, at a substep 137. To reduce computational complexity, a palette of 32 surface normals are preferably pre-calculated during construction of the object at 45 degree increments about the center of an upper hemisphere. The Autogen module can then select the pre-calculated surface normal that most closely matches the orientation of each building wall, rather than computing the exact surface normal for each building wall.

The Autogen module also determines a whiteness value to be applied to each wall of the building, at a substep 138. The whiteness value corresponds to the amount of ambient (i.e., diffuse) and direct light from a light source that is incident on each wall of the building. The whiteness value is used to adjust the texture color values on the wall and roof surfaces of the building. Specifically, for each surface of the building, a corresponding original texture color value from the texture file is multiplied by a combination of the ambient and direct light components of the light incident on the surface. In particular, a directional component of the direct light is determined with regard to each surface normal, and the directional component is added to the ambient light component for each wall of the building.

When the building is rendered for display, the sum of the directional component and the ambient component of the light incident on each surface are multiplied by each color value of the corresponding original texture at each point (display pixel) on the building. Preferably, the sum is limited to a value between zero and one, where the value of one represents pure white light. The above discussion can be summarized for each primary color value (i.e., red, green, and blue) by the following equation:

$$(\text{New Texture Color})_{pc} = \text{Min}[(\text{Ambient}_{pc} + \text{Direct}_{pc}), 1]$$
$$(\text{Original Texture Color})_{pc}$$

where PC is each primary color, i.e., red, green, and blue. Thus, there is a new red, green, and blue value computed for each point (display pixel) for the visible surfaces of the building. Note that the ambient and directional lighting depends on the characteristics of the simulated environment, such as the sun location associated with the simulated time of day and the simulated season of the year. Cloud cover, the presence of a moon, and other characteristics may also affect the lighting. These characteristics may be determined directly from a users computer (e.g., date and time), and/or predetermined from user settings or saved settings.

Once the lighting is determined, the Autogen module determines, at a step 140, a center of the building footprint relative to the center of the tile. Relative to the building center, the Autogen module determines a width, depth, and rotation angle of the building, at a step 142. The rotation angle of the building is relative to the orientation of the tile. At a step 144, the Autogen module then determines opposite corner points for the building footprint. From the corner points, the Autogen module creates a full building footprint, at a step 146. Control then passes to a step 148 via a connector A.

FIG. 8 is a flow diagram illustrating continued logic for generating graphics data to render a 3D building. At a step 148, the Autogen module determines a mapping of the texture coordinates to the building vertices according to the nearest integral wall and/or roof cell size for the building texture. As indicated above, the texture data is mapped into the dimensions of the building so that no texture cells are split. To triangulate the building, the Autogen module then calculates the area of the building footprint, at a step 150. The footprint area could have been calculated and saved at a previous step, but the simple multiplication process needed to derive the footprint area is more efficient than using up memory size and processor cycles to store and access the data. At a step 152, the Autogen module then defines triangles to cover each surface of the building object. A minimum number of triangles are defined to maintain rendering efficiency.

At a step 154, the Autogen module reads the building type from the previously generated object data. As indicated above, the building type may, for example, be a house, a warehouse, or a variety of multi-floor office or apartment buildings. The Autogen module determines, at a decision step 156, whether a pitched roof is appropriate for the building type. If a pitched roof is appropriate for the building type, the Autogen module calculates roof surface normals, lighting, color, and triangles for the roof surfaces, at a step 158. At a step 160, the Autogen module reads the wall texture data from the previously derived texture file. If the time of day indicates dusk lighting conditions, day-time wall texture data may be blended with night-time wall texture data to further enhance realism of the simulation. Similarly, the Autogen module reads the appropriate roof texture, at a step 162, and blends the day and night roof textures, if appropriate, based upon the time of day. At a step 164, the Autogen module sets an opacity value that is used to fade the building into or out of view as the radial distance of the building from the viewpoint changes between adjacent LOD rings. At this point all of the graphics data is defined for the building to be displayed.

FIG. 9 is a flow diagram illustrating logic for generating graphics data to display an alternate type of 3D object, such as a vegetation object. As indicated above, vegetation objects are rendered as orthogonal planes. At a step 170 the Autogen module determines a center point of the object relative to the center of the tile. At a step 172, the Autogen module then determines a width, height, and rotation angle of the object in a similar fashion as that used for buildings. Also similar to buildings, the Autogen module determines a mapping of the texture coordinates to the dimensions of the rectangular planes, at a step 173. At a step 174, the Autogen module defines points and triangles to cover the orthogonal planes in a manner similar to that described above.

At a step 176, the Autogen module reads the appropriate portion of the vegetation texture from the previously derived file. Preferably, the Autogen module also applies an alpha mask, causing the texture values to be transparent outside boundaries of the vegetation image. Specifically, the alpha mask has a color key outside an outline of the vegetation object. The color key indicates that the area outside the vegetation image should be transparent, so that the rectangular outline of the orthogonal planes do not appear in the simulation. The Autogen module also determines lighting for the vegetation object and adjusts the texture color values, at a step 178, in a similar fashion to that described above in regard to building objects.

Figure 10:
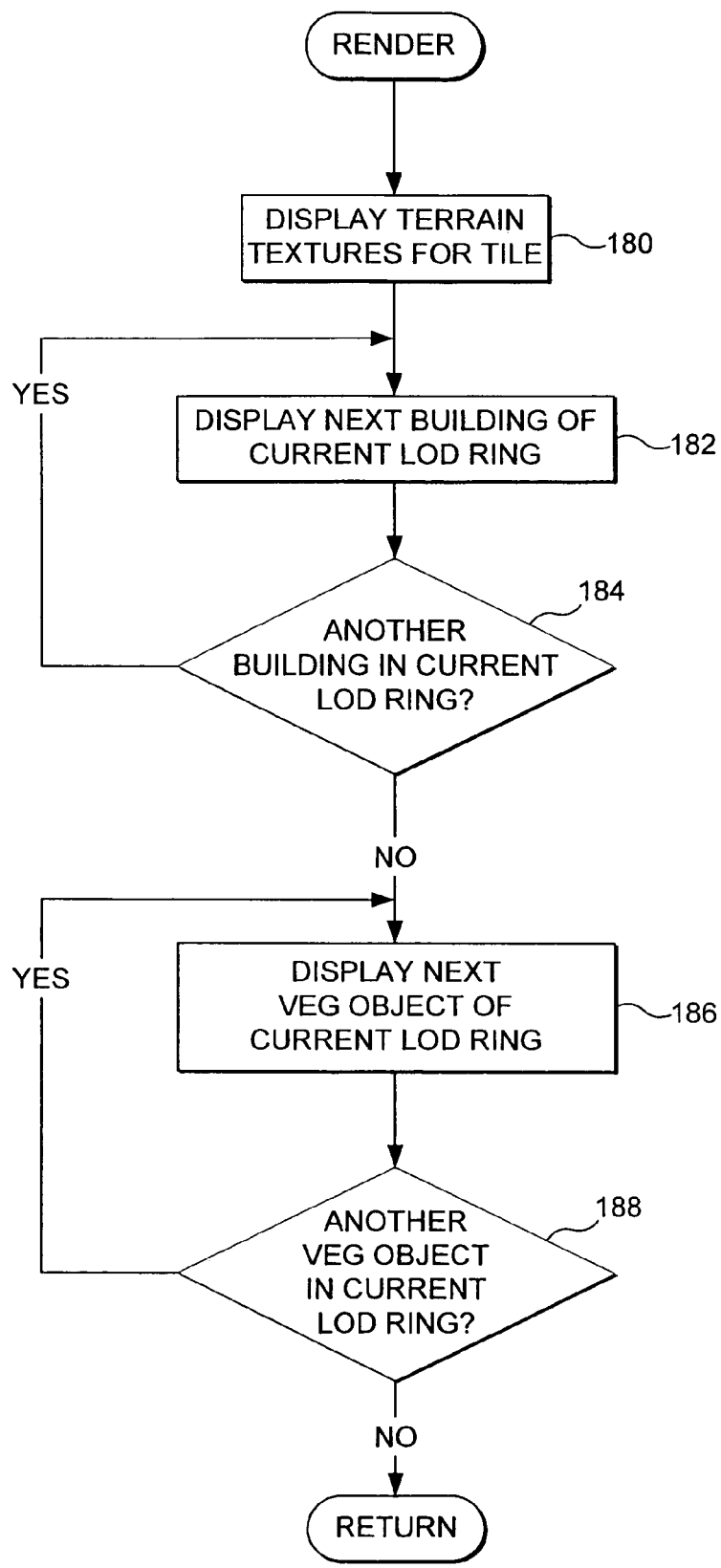
FIG. 10 is a flow diagram illustrating logic for rendering the scenery objects according to the current LOD ring.

FIG. 10 is a flow diagram illustrating logic for rendering the scenery objects according to the current LOD ring. At a step 180, a rendering module displays the 2D terrain textures of the tile. At a step 182, the rendering module displays a building object assigned to the current LOD ring. This step may include fading the building object into view to avoid an undesirable sudden display of the building object as the current LOD ring changes from one LOD ring to an adjacent LOD ring. Preferably, the object is faded into or out of view by varying an alpha factor for each pixel over a relatively short duration of time. Other visual characteristics can also be faded into view. For example, snow can be faded into view on the objects and on the terrain textures over a different period of time. To accumulate snow, the whiteness value of the incident light may be modulated, a snow texture may be gradually blended with the object texture, or other known methods of fading a white color onto an object can be employed. At a decision step 184, the rendering module determines whether another building object is associated with an LOD ring equal to, or radially beyond, the current LOD ring. If another building object is to be displayed for the current LOD ring, control returns to step 182.

When the rendering module has begun to display all building objects as a function of the LOD ring associated with the building objects and the current LOD ring, the rendering module also begins displaying other scenery objects. For example, at a step 186, the rendering module displays a vegetation object associated with an LOD ring that is equal to or beyond the current LOD ring. As described above, the vegetation object is displayed in two orthogonal planes. Vegetation objects are also preferably faded into or out of view, as described above. At a decision step 188, the rendering module determines whether another vegetation object is associated with an LOD ring equal to or beyond the current LOD ring. If another vegetation object is to be displayed for the current LOD ring, control returns to step 186. Once all scenery objects associated with an LOD ring equal to or beyond the current LOD ring have been displayed, control returns to a scenery database module that maintains overall control of scenery generation and rendering.

Although the present invention has been described in connection with the preferred form of practicing it and modifications thereto, those of ordinary skill in the art will understand that many other modifications can be made to the present invention within the scope of the claims that follow. For example, scenery objects may be rendered on a wall texture tile, on a tile of a fictitious world, or other background. Accordingly, it is not intended that the scope of the invention in any way be limited by the above description, but instead be determined entirely by reference to the claims that follow.

The invention claimed is:

1. A method for efficiently rendering graphic objects within a visual tile that is included in a plurality of visual tiles of an electronic simulation, so that a number of the graphic objects that are visible in the visual tile from a viewpoint varies with a distance between the viewpoint and the visual tile, comprising the steps of:
    (a) for each graphic object in the visual tile, pseudo-randomly selecting a level of detail (LOD) value for inclusion in data defining the graphic object, said LOD value being thus associated with the graphic object and indicating a maximum relative distance between the viewpoint and the visual tile at which the graphic object will be visible in the electronic simulation;
    (b) determining a current LOD value for the visual tile as a function of the distance between the visual tile and the viewpoint in the electronic simulation;
    (c) comparing the current LOD value for the visual tile with the LOD values that were pseudo-randomly selected for each of the graphic objects in the visual tile to determine the graphic object that are visible for the current LOD value; and
    (d) rendering and displaying each graphic object that is visible for the current LOD value of the visual tile, so that the number of the graphic objects visible in the visual tile increases as the distance between the visual tile and the viewpoint decreases.

2. The method of claim 1, wherein the step of pseudo-randomly selecting an LOD value comprises the steps of:
    (a) determining a seed value as a function of a location of the visual tile in the electronic simulation;
    (b) generating the LOD value as a function of the seed value; and
    (c) assigning the LOD value to the graphic object.

3. The method of claim 1, wherein the step of determining a current LOD value for the visual tile comprises the steps of:
    (a) detecting that the visual tile is within a predefined maximum range of the viewpoint;
    (b) determining the distance between the visual tile and the viewpoint; and
    (c) determining the LOD value associated with the distance that was determined in the preceding step.

4. The method of claim 1, wherein the step of rendering each graphic object comprises the steps of:
    (a) determining a mapping of a texture to a size of the graphic object according to an integral cell size of the texture such that an integral cell of the texture is not divided;
    (b) applying the texture to at least one surface of the graphic object according to the mapping; and
    (c) displaying the graphic object with the texture applied to the graphic object.

5. The method of claim 1, wherein the step of rendering the graphic objects comprises the step of changing an opacity factor over a period of time to vary a visibility of the graphic objects as a function of the LOD value associated with the graphic objects and the distance between the viewpoint and the visual tile, causing said graphic objects to fade into view as the distance between the viewpoint and the visual tile decreases and to fade out of view as the distance between the viewpoint and the visual tile increases.

6. The method of claim 1, wherein the step of rendering includes the step of rendering each graphic object as one of:
    (a) a solid graphic object, such that the step of rendering the graphic object as the solid graphic object comprises the step of displaying a plurality of adjacent surfaces of the graphic object in accordance with the data defining the graphic object and by applying textures to each surface of the graphic object that is visible; and
    (b) an orthogonal-plane graphic object, such that the step of rendering the orthogonal-plane graphic object comprises the step of displaying a pair of orthogonal planes in accordance with the data defining the graphic object and applying textures to the orthogonal planes.

7. The method of claim 1, wherein the data defining the graphic object comprises at least one of a location within the visual tile, a height, a width, a depth, an orientation, and a texture to be applied to the graphic object.

8. A system for efficiently rendering graphic objects within a visual tile that is included in a plurality of visual tiles of an electronic simulation, so that a number of the graphic objects that are visible in the visual tile from a viewpoint varies with a distance between the viewpoint and the visual tile, comprising:
    (a) a processor;
    (b) a display in communication with the processor; and
    (c) a memory in communication with the processor and storing machine instructions that cause the processor to:
        (i) for each graphic object in the visual tile, pseudo-randomly select a level of detail (LOD) value for inclusion in data defining the graphic object, said LOD value being thus associated with the graphic object and indicating a maximum relative distance between the viewpoint and the visual tile at which the graphic object will be visible in the electronic simulation;
        (ii) determine a current LOD value for the visual tile as a function of the distance between the visual tile and the viewpoint in the electronic simulation;
        (iii) compare the current LOD value for the visual tile with the LOD values that were pseudo-randomly selected for each of the graphic objects in the visual tile to determine the graphic object that are visible for the current LOD value; and
        (iv) render each graphic object that is visible for the current LOD value of the visual tile, so that the number of the graphic objects visible in the visual tile increases as the distance between the visual tile and the viewpoint decreases.

9. The system of claim 8, wherein the machine instructions that cause the processor to pseudo-randomly select an LOD value, cause the processor to:///
(a) determine a seed value as a function of a location of the visual tile in the electronic simulation;
(b) generate the LOD value as a function of the seed value; and
(c) assign the LOD value to the graphic object.

10. The system of claim 8, wherein the machine instructions that cause the processor to determine a current LOD value for the visual tile, cause the processor to:
(a) detect that the visual tile is within a predefined maximum range of the viewpoint;
(b) determine the distance between the visual tile and the viewpoint; and
(c) determine the LOD value associated with the distance that was determined in the preceding step.

11. The system of claim 8, wherein the machine instructions that cause the processor to render each graphic object, cause the processor to:
(a) determine a mapping of a texture to a size of the graphic object according to an integral cell size of the texture such that an integral cell of the texture is not divided;
(b) apply the texture to at least one surface of the graphic object according to the mapping; and
(c) display the graphic with the texture applied to the graphic object.

12. The system of claim 8, wherein the machine instructions that cause the processor to render the graphic objects, cause the processor to change an opacity factor over a period of time to vary a visibility of the graphic objects as a function of the LOD value associated with the graphic objects and the distance between the viewpoint and the visual tile, causing said graphic objects to fade into view as the distance between the viewpoint and the visual tile decreases and to fade out of view as the distance between the viewpoint and the visual tile increases.

13. The system of claim 8, wherein the data defining the graphic object comprises at least one of a location within the visual tile, a height, a width, a depth, an orientation, and a texture to be applied to the graphic object.

* * * * *